(12) United States Patent
Hellman et al.

(10) Patent No.: US 6,204,970 B1
(45) Date of Patent: Mar. 20, 2001

(54) METHOD OF SPECTRALLY TUNING A FILTER

(75) Inventors: Scott M. Hellman, Alizo Viejo, CA (US); Kurt R. Francis, Yuma, AZ (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/460,228

(22) Filed: Dec. 13, 1999

(51) Int. Cl.[7] .............................. G02B 27/00; G02F 1/03; H01S 3/00; H04J 14/02
(52) U.S. Cl. ........................ 359/578; 359/577; 359/260; 359/346; 359/124
(58) Field of Search ..................................... 359/577, 578, 359/590, 260, 124, 130, 131, 346; 372/20; 385/73; 356/346

(56) References Cited

U.S. PATENT DOCUMENTS

| | | | |
|---|---|---|---|
| 4,813,756 | 3/1989 | Frenkel et al. | 350/96 |
| 5,361,155 | * 11/1994 | Chiaroni et al. | 359/131 |
| 5,491,582 | 2/1996 | Fujita | 359/341 |
| 5,625,613 | 4/1997 | Kato et al. | 369/112 |
| 5,781,341 | 7/1998 | Lee | 359/578 |
| 6,040,944 | * 3/2000 | Pan et al. | 359/590 |

* cited by examiner

*Primary Examiner*—Audrey Chang
(74) *Attorney, Agent, or Firm*—Price, Heneveld, Cooper, DeWitt & Litton

(57) ABSTRACT

A method for tuning a dielectric filter comprises determining filter characteristics of a filter including a cut-on wavelength and a cut-off wavelength taken at a selected gain level. The filter is rotatably attached to a collimator assembly and a light source having a wavelength approximately equal to the cut-on frequency is applied to the filter and rotated to adjust the filter to the cut-on wavelength, and the spectral performance is measured and compared with a cut-on rating value. The method further includes applying a light signal having a wavelength set to a cut-off wavelength, to the filter rotating the filter relative to the collimator assembly, measuring spectral performance, and comparing the measured spectral performance with a cut-off rating value. The light source having a wavelength set to the cut-on wavelength is reapplied to the filter, and the difference in measured spectral performance with the rating values for each of the low cut-on wavelength and high cut-off wavelength are compared to determine if the difference is within an acceptable range. The steps are repeated until the difference is within an acceptable range and the filter is thus fixedly attached to the collimator assembly to complete the resultant filter.

25 Claims, 3 Drawing Sheets

METHOD OF SPECTRALLY TUNING A FILTER

BACKGROUND OF THE INVENTION

1. Field of the Invention

The present invention generally relates to optical filters, and more particularly to a technique for tuning a dielectric filter in a collimator assembly.

2. Technical Background

Data communication systems increasingly are employing light signals and optical fibers for the transmission of information. The use of optical fibers allows the transmission of large amounts of data at high speeds and with low signal loss over long distances. To increase the data transmission capacity on an optical fiber, a plurality of light signals at different wavelengths are commonly multiplexed with wavelength division multiplexing for transmission through a single optical fiber so that the information is transmitted on multiple wavelengths, i.e., channels. In a wavelength division multiplexed system, the plurality of light signal sources have different wavelengths corresponding to different signal channels. After the multiple channels are transmitted through the optical fiber, the multiple wavelength signals are separated at a receiving end with the use of a demultiplexer to separate the individual signal channels. Select wavelength band filters may be used as one technique to select specific channel wavelengths.

In order to maximize utilization of the available bandwidth, the channel wavelength band and any wavelength separation between adjacent channels should be minimized. Accordingly, to minimize the wavelength band for each signal channel, a narrow band filter is used for accurately selecting the narrow band channel. Such filters are generally fixed, although other filters are tunable to a selected frequency.

One common filter tuning approach is to tune a dielectric filter in a collimator package to resolve a single spectral feature, such as a peak value. The single spectral feature is generally correlated to a specified waveform and serves as the target wavelength for resolving the angle of incidence for that filter. One disadvantage to this approach is that the accuracy for resolving the target wavelength based on a single spectral feature is generally limited such that the per channel wavelength band of the filter is limited. Inaccuracy in resolving the target wavelength may induce significant error for optimal spectral alignment of the dielectric filter. Accordingly, the accuracy of the dielectric filter's initial spectral measurement and optimizing the resulting target wavelength currently limits precise spectral alignment to a collimator assembly's optical axis. For this reason and others, it is desirable to provide a technique and structure for tuning a tunable filter with a high degree of accuracy.

SUMMARY OF THE INVENTION

The present invention provides a tunable filter and method of spectrally tuning a dielectric filter with precise tuning accuracy. To achieve this and other advantages, and in accordance with the purpose of the present invention as embodied and described herein, the present invention provides for a method for tuning a dielectric filter comprising the steps of determining filter characteristics including a cut-on wavelength and a cut-off wavelength at a selected gain level. The filter is aligned with a collimator assembly, and a light source having a wavelength approximately equal to the cut-on frequency is applied as an input to the filter. The collimator assembly is rotated relative to the filter to adjust the filter to the determined cut-on wavelength, the spectral performance is measured, and the measured spectral performance is compared with a cut-on rating value. The method further includes the steps of applying as an input to the filter a light signal having a wavelength set to a cut-off wavelength, rotating the collimator assembly relative to the filter, measuring spectral performance, and comparing the measured spectral performance with a cut-off rating value. The difference in measured spectral performance with the rating values for each of the cut-on wavelength and cut-off wavelength are compared to determine if the difference is within an acceptable range. If the difference is not within an acceptable range, the steps of applying a light signal at the cut-on and cut-off wavelengths and rotating the collimator assembly is repeated until the difference is within an acceptable range. The method advantageously tunes a dielectric filter by utilizing with the cut-on wavelength and a cut-off wavelength to provide precise filter tuning and a resultant filter with a high degree of accuracy.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

Figure 1:
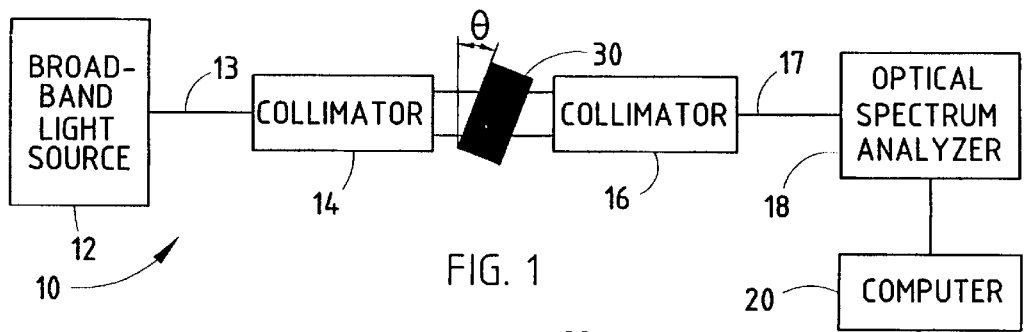
FIG. 1 is a block diagram of a filter measurement system used in the present invention for measuring wavelength characteristics of a filter.

Referring to FIG. 1, a filter measurement system 10 is illustrated for measuring the filter characteristics of a dielectric filter 30. The measurement system 10 includes a broadband light source 12, such as an amplified spontaneous emission (ASE) light source, for generating a variable wavelength light signal. The measurement system 10 also includes an input Grin lens collimator 14 and an output Grin lens collimator 16 disposed on the respective input and output sides of a dielectric filter 30. An optical fiber 13 couples light source 12 to the input of collimator 14. The output of collimator 14 focuses the light signal onto the filter 30, while collimator 16 receives and collects the output light beam passing through the filter 30 and transmits the signal onto optical fiber 17.

A conventional optical spectrum analyzer 18 is connected to optical fiber 17 for receiving the light signal and spectrally analyzing the wavelength spectrum of the received light signal. Measurement system 10 further includes a computer 20 coupled to optical spectrum analyzer 18 for processing the measured signal data and storing the data in memory. The computer 20 may include a general purpose, commercially available computer with standard interface circuit and a digital controller and/or analog circuits to process the information.

The dielectric filter 30 is disposed between the input collimator 14 and output collimator 16 at a predetermined angle θ of incidence. According to the preferred embodiment, the dielectric filter 30 is arranged at an angle of incidence in the range of 1.7 to 3.3 degrees, and more preferably at an angle of approximately 1.8 degrees relative to an axis perpendicular to the output light beam of input collimator 14. With the filter 30 arranged in place between the Grin lens collimators 14 and 16, the broadband light source 12 is varied in wavelength through a predetermined spectrum, while the optical spectrum analyzer 18 measures the gain power in decibels (dB) for the wavelength spectrum of analysis.

In addition, the computer 20 has a specified target waveform stored in memory. The computer 20 receives the measured power spectrum from the optical spectrum analyzer 18 and compares the measured power spectrum to the target waveform stored in memory. Computer 20 further determines the insertion loss error function (ILEF) as the difference between the target waveform and the measured spectrum of the filter 30. In addition, the measurement system 10 measures the −15 dB cut-on and cut-off transmission points and the center wavelength which are used as primary targets for tuning the filter's spectrum in a collimator assembly package. While the filter characteristics are measured with the measurement system 10 shown and described herein, it should be appreciated that the filter characteristics could otherwise be measured without departing from the teachings of the present invention.

Figure 2:
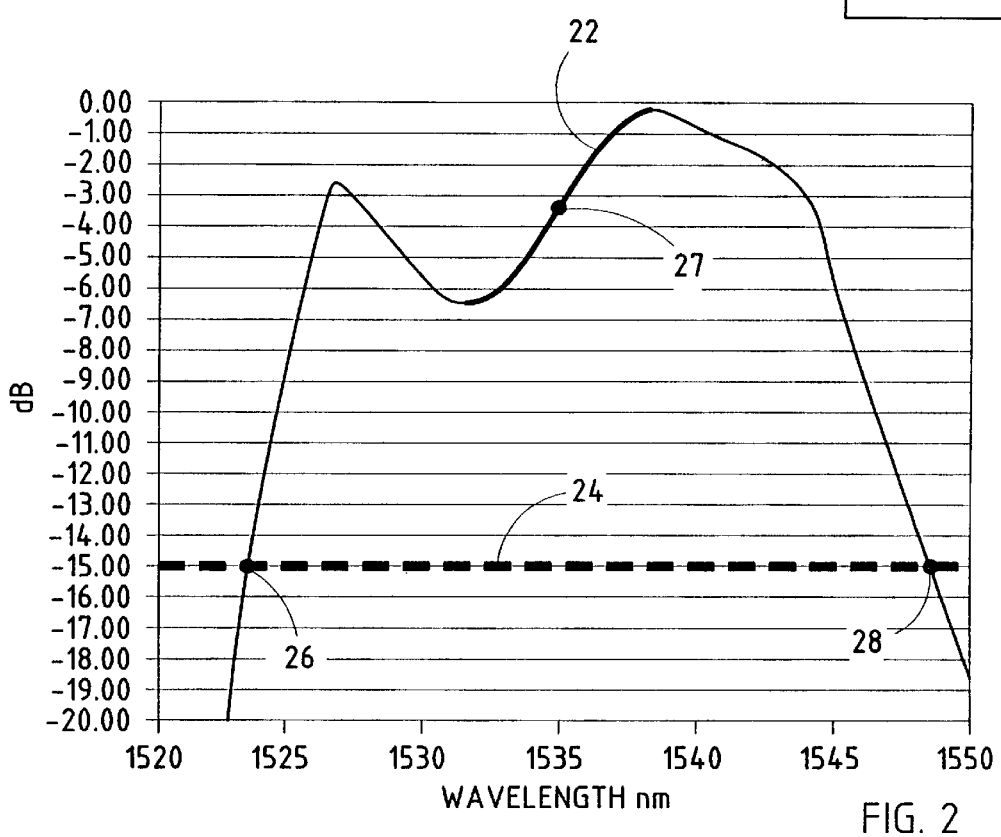
FIG. 2 is a power versus wavelength diagram of one example of a target waveform for a dielectric filter.

Referring now to FIG. 2, one example of a target waveform is shown for a typical 3-cavity gain flattening filter (GFF). The gain flattening filter is specified to have a target waveform 22 as shown by the thickened solid line. The target waveform 22 is generally dependent on the application for which the filter is intended to be used. The target waveform 22 has a −15 dB cut-on wavelength at point 26 and a −15 dB cut-off wavelength at point 28 as selected at a −15 dB gain level 24. The target waveform 22 also has a center wavelength point 27 midway between the cut-on and cut-off points 26 and 28. The cut-on and cut-off points 26 and 28 are taken at wavelengths where the slope of gain is substantially constant to define a wavelength band therebetween. It should be appreciated that the measured waveform generally will exhibit somewhat similar characteristics, but is limited in accuracy due to the limitations of the optical spectrum analyzer. The difference between the measured power spectrum waveform and the target waveform provides the insertion loss error function which is minimized by the spectral tuning methodology of the present invention. The measured power spectrum is shifted linearly to minimize the insertion loss error function and the spectral shift is used to define whether the filter is compliant to the maximum insertion loss error function allowable. If the insertion loss error function is too great, the filter 30 is preferably not employed in the tuning methodology of the present invention, since the corresponding filter does not have characteristics desirable for tuning to within an acceptable level.

The accuracy of the measurement system 10 used to define the spectral characteristics of a dielectric filter is generally limited to the measurement equipment's resolution. The measured filter characteristics may be measured with the measurement system 10 by the manufacture of the dielectric filter at a location remote from where the filter tuning occurs. Accordingly, the measurement system 10 provides the measured filter characteristics in a readable form so that a user may enter the characteristics into the filter tuning system or download the characteristics via memory card. According to one example, a printout of the measured filter characteristics is provided so that a user can enter the characteristics into the tuning system. The spectral resolution of a system employing an erbium-doped amplified spontaneous emission source and an optical spectrum analyzer as explained herein may have a resolution of approximately 0.050 nanometers. While one example of a measurement system 10 and a gain flattening filter are described herein, it should be appreciated that the present invention may employ other measurement systems, and is not limited to tuning a gain flattening filter, as the filter may include other types of dielectric filters including, but not limited to, narrow band wavelength division multiplexing (WDM) filters.

Figure 3:
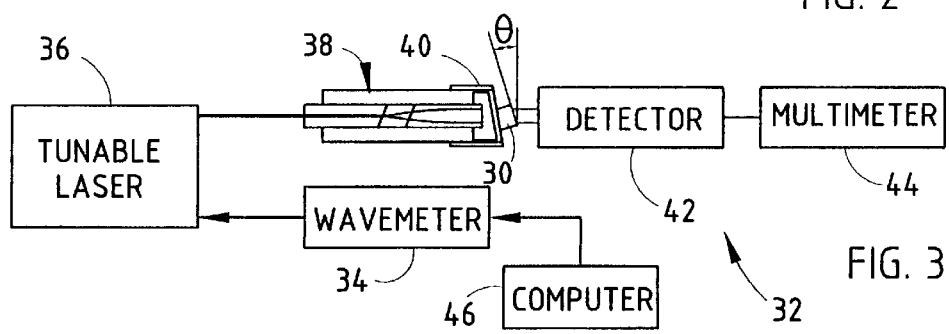
FIG. 3 is a schematic and block diagram of a filter tuning system according to the present invention.

Referring to FIG. 3, a filter tuning system 32 is illustrated for tuning a dielectric filter 30 with a collimator assembly 38 to achieve acceptable filter characteristics. The filter tuning system 32 includes a wavemeter 34 and a tunable laser source 36. The tunable laser source 36 provides a light beam that may be adjusted to select wavelengths in response to the wavelength set by the wavemeter 34 controlled by a computer 46. The collimator assembly 38 receives the laser light signal which is focused onto the filter 30. The output of filter 30 is coupled to an optical detector 42 to receive the filtered light output. A power multimeter 44 is coupled to an output of the optical detector 42 and provides an output reading of the power rating in decibels (dB) which corresponds to the wavemeter 34. The computer 46 enables a user to more easily select the desired wavemeter setpoints to select the cut-on and cut-off wavelengths. The wavemeter setpoints may be entered by a user by keying in filter characteristics provided on the printout provided from the measurement system 10. Alternately, a memory card containing filter characteristics may be downloaded into computer 46. Computer 46 is a commercially available computer with a digital controller or suitable analog circuits.

Figure 4:
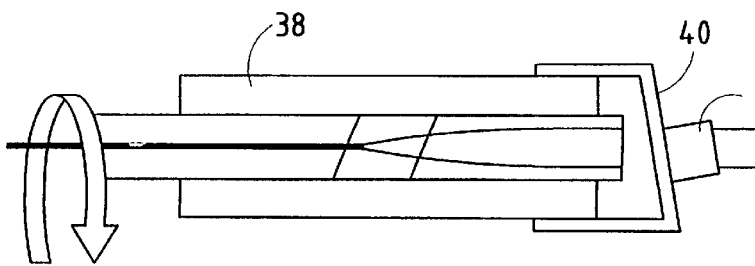
FIG. 4 is an enlarged schematic view of the collimator assembly shown in FIG. 3.

The collimator assembly 38 is shown in detail in FIG. 4. Attached to the output end of the collimator assembly 38 is a filter holder 40. The filter 30 is fixedly bonded in place to the filter holder 40 to be arranged at an angle θ (FIG. 3) to the perpendicular direction of the light beam output of the collimator assembly 38. Angle θ is selected to be in the range of from about 1.7 to about 3.3 degrees and, preferably is set to approximately 1.8 degrees. The Grin lens collimator 38 has an inherent output field angle of from about 0.5 to about 1.0 degrees. As the filter holder 40 is rotated about the collimator assembly 38, the filter 30 rotates relative to the collimated source to shift the filter's center wavelength, resulting in changing the angle of incidence. By rotating the filter 30 on the filter holder 40, the filter 30 may be optimally tuned to provide the desired filter characteristics as explained herein. Once the filter 30 is tuned to achieve filter characteristics within an acceptable tolerance, the filter 30 and filter holder 40 are fixedly bonded to the collimator 38 to provide a tuned filter and collimator assembly that may be used in various applications to filter light signals.

Figure 5A:
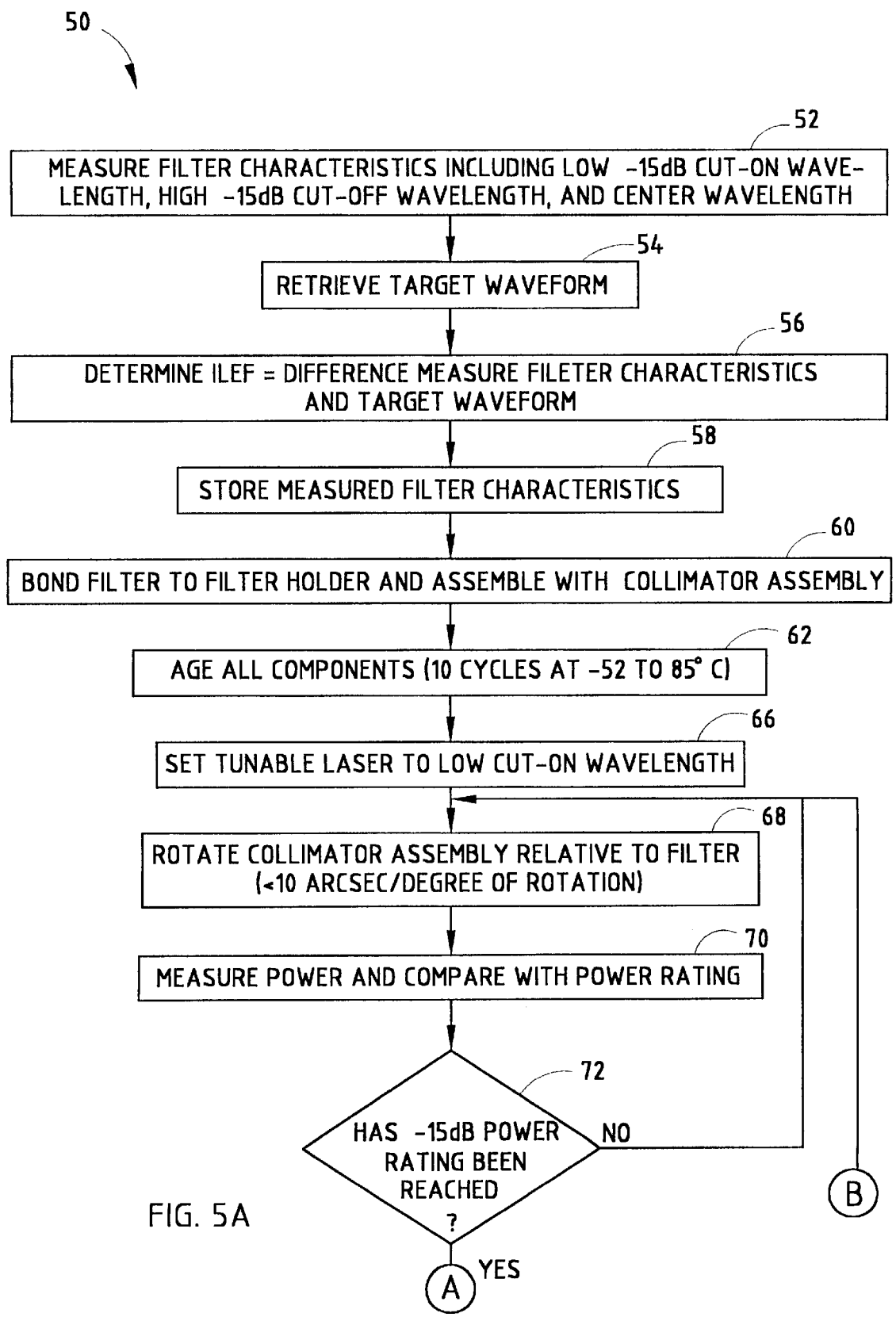
FIGS. 5A and 5B is a flow diagram illustrating steps employed for tuning a dielectric filter according to the present invention.
Figure 5B:
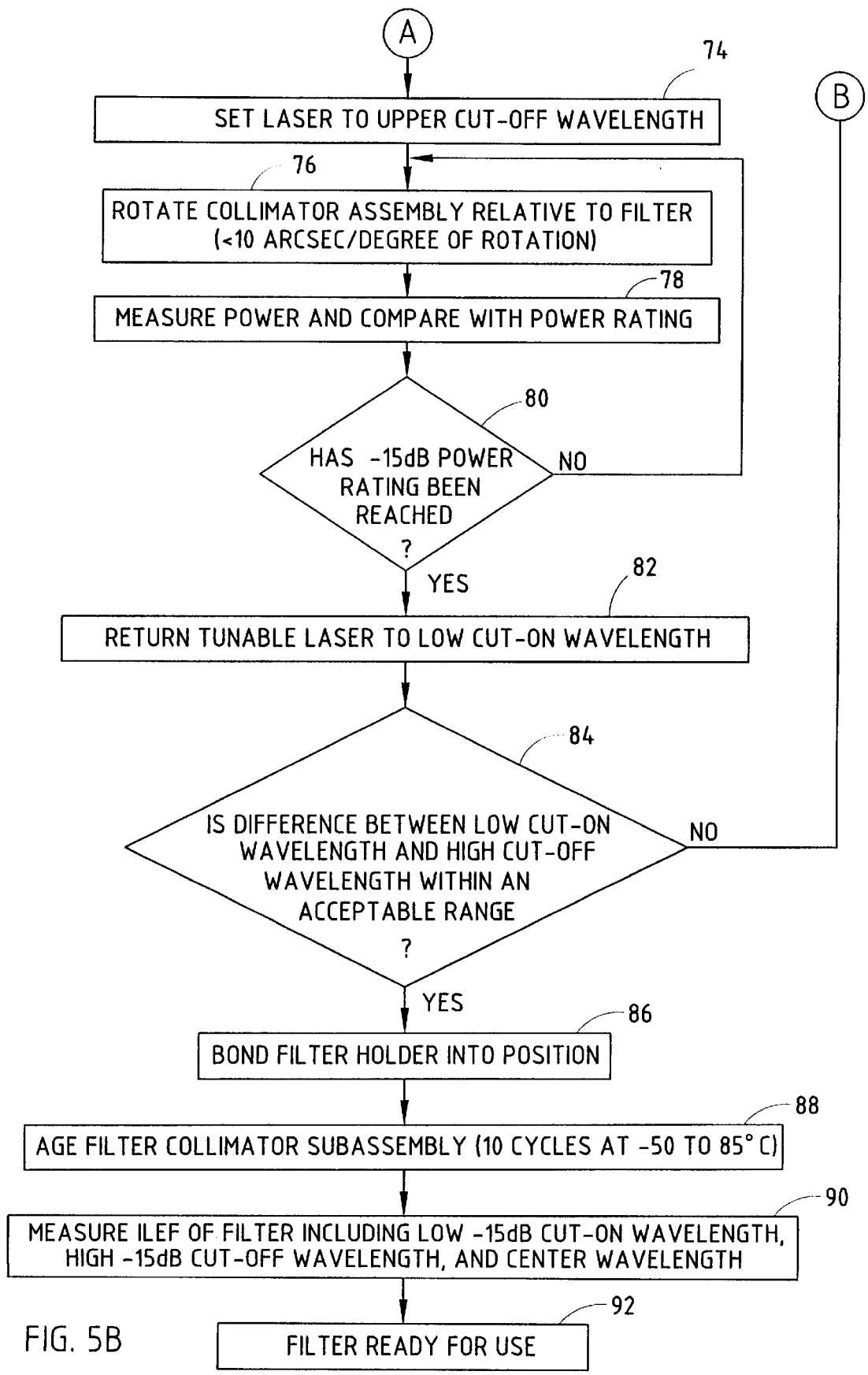

Referring to FIGS. 5A and 5B, the method 50 of tuning a dielectric filter is provided according to the present invention is illustrated. Filter tuning method 50 includes step 52 of measuring filter characteristics including the low −15 dB cut-on wavelength, the high −15 dB cut-off wavelength, and the center wavelength. The filter characteristics may be measured with the measurement system of FIG. 1 by the filter manufacturer. It should be appreciated that the measurement of the −15 dB cut-on and cut-off wavelengths provides that the power rating corresponding thereto will be taken from a region that is substantially linear. While a −15 dB power cutoff is used herein, it should be appreciated that other cutoff powers may be used without departing from the present invention.

Once the cut-on, center, and cut-off wavelengths are determined, step 54 retrieves the specified target waveform spectrum analyzer 18 (FIG. 1), which waveform may be specific to the type of application intended for use by the filter. The method then proceeds to step 56 to determine, using computer 20 and a conventional algorithm, the insertion loss error function (ILEF) which is equal to the difference between the measured filter characteristics and the specified target waveform. Once the filter characteristics and ILEF are determined, the determined values are stored in computer memory in step 58.

Once the filter characteristics and ILEF have been measured and stored in memory, the filter 30 is bonded in place, preferably with epoxy, to the filter holder as shown by in step 60. The various components used in the filter tuning setup, including the filter and filter holder assembly, are then aged as shown by step 62 to stress relieve the epoxy bond prior to the alignment and bonding of the filter to the collimator assembly. The aging step 62 may include subjecting the components or subassemblies to ten temperature cycles with a temperature variation of between −50° C. to +85° C. According to one example, the temperature aging step 62 starts at a temperature of +85° C. for 30 minutes, then ramps down at a rate of 3 degrees per minute to a temperature of −40° C., remains at −40° C. for 30 minutes, and then repeats the temperature variation for the next cycle. The temperature cycling minimizes spectral shift of the optimized center wavelength due to stress induced alignment changes in the collimator/filter. Thereafter, the filter 30 is assembled onto the collimator assembly as shown by step 64. At this point, the filter 30 is ready to be tuned as now described.

The filter tuning method 50 includes step 66 of setting the tunable laser to the low cut-on wavelength. In step 68, the collimator assembly is then rotated relative to the filter. Each incremental amount of rotation preferably is less than ten arc seconds per degree of rotation. Rotation of the collimator assembly relative to the filter typically will be accomplished by rotating the filter holder and filter mounted thereto relative to the stationary collimator. At each incremental angle of rotation, the power is measured by multimeter 44 and compared to the cut-on power rating. The comparison can be made by the person performing the tuning process, with or without the aid of a computer, such as computer 46. Decision block 72, of which is performed by the tuning person or program for computer 46, checks to see if the −15 dB power rating has been reached and, if not, returns to step 68. If the −15 dB power rating has been reached, method 50 proceeds to step 74 to set the tunable laser to the upper cut-off wavelength.

With the laser set by wavemeter 34 to the cut-off wavelength, the filter is again rotated relative to the colli-mator assembly in step 76. The rotation in step 76 is preferably in increments of less than ten arc seconds per degree of rotation. At each incremental angle of rotation, the power is measured by multimeter 44 and compared to the cut-off power rating in step 78. Decision block 80 checks to see if the −15 dB power rating has been reached and, if not, returns to step 76. If the −15 dB power rating has been reached, method 50 proceeds to return the tunable laser to the low cut-on wavelength in step 82.

Next, decision block 84 checks the measured data to see whether the difference between each of the cut-on wavelength power and cut-off wavelength power and the corresponding power ratings are within an acceptable range. Accordingly, method 50 checks both the low cut-on wavelength and high cut-off wavelength at the same time to see if both power measurements are within an acceptable range. An acceptable range may include ±0.5 dB, for example, for a gain flattening filter or ±0.25 dB for a narrow band WDM filter. If either the cut-on or cut-off wavelength measurements are not within the acceptable range, method 50 returns to step 68 to repeat the rotation and measurement of power at each of the low cut-on and high cut-off wavelength. Once the difference between each of the low cut-on and high cut-off wavelength measurements and the corresponding power ratings are within the acceptable range, the filter is adequately tuned and method 50 proceeds to step 86 in which the filter holder is bonded preferably with an epoxy to the collimator assembly. Once bonded in position, the filter holder with filter and the collimator assembly are fixed relative to each other.

Following the bonding step 86, the bonded filter and collimator assembly is aged in step 88 to mechanically stabilize the package. The aging step 88 may include subjecting the assembly to ten temperature cycles by varying the temperature between 50° C. to 85° C. For example, the aging step 88 may include starting at +85° C. for 30 minutes, ramping down at a rate of 3 degrees per minute to −40° C., remaining at −40° C. for 30 minutes, and repeating the next cycle. The temperature cycling minimizes spectral shift of the optimized center wavelength due to stress induced alignment changes in the collimator/filter subassembly. Following the aging step 88, method 50 proceeds to measure the ILEF of the filter, including measuring the low −15 dB cut-on wavelength, the high −15 dB cut-off wavelength, and the center wavelength in step 90 to determine whether the bonded assembly and filter is thermally stable following the aging process. Following step 90, the filter construction is completed and is ready for use as indicated by block 92.

The field angle of the collimator 38, the slope of the measured power spectrum taken at the −15 dB cut-off points, and resolution of the measuring equipment generally define the accuracy of the tuning methodology. The output power in terms of spectral change at −15 dB may be approximately ±0.03 dB/picometer for a 3-cavity filter design according to the example provided herein. If the spectral resolution of the measurement system is 0.005 nanometers, the resulting accuracy for tuning the filter to the target center wavelength may be less than 0.010 nanometers for a gain flattening filter. The filter tuning methodology 50 of the present invention advantageously tunes a dielectric optical filter 30 to within an acceptable range with enhanced tuning accuracy, as compared to conventional measurement systems, for tuning the filter to the target.

It will become apparent to those skilled in the art that various modifications to the preferred embodiment of the invention as described herein can be made without departing from the spirit or scope of the invention as defined by the appended claims.

What is claimed is:

1. A method for tuning a dielectric filter comprising the steps of:

determining filter characteristics of a dielectric filter including a cut-on wavelength and a cut-off wavelength at a selected gain level;

aligning the filter to a collimator assembly;

applying a light signal having a wavelength approximately equal to the determined cut-on wavelength to an input of the filter;

rotating the filter relative to the collimator assembly to adjust the filter to the determined cut-on wavelength;

measuring the spectral performance of the filter at the cut-on wavelength; comparing the measured spectral performance with a predetermined cut-on rating value;

applying a light signal having a wavelength set to the determined cut-off wavelength to an input of the filter;

rotating the filter relative to the collimator assembly to adjust the filter to the determined cut-off wavelength;

measuring the spectral performance of the filter at the cut-off wavelength; comparing the measured spectral performance with a predetermined cut-off rating value;

comparing the difference in measured spectral performance with the rating values for each of the cut-on wavelength and cut-off wavelength to determine if the difference is within an acceptable range; and repeating the steps of applying a light signal at the cut-on and cut-off wavelengths and rotating the filter with respect to the collimator assembly if the difference is not within an acceptable range until the differences are within the acceptable range.

2. The method of claim 1 further comprising the step of:

bonding the filter in place to the collimator assembly if the determined difference is within an acceptable range.

3. The method of claim 2 further comprising the step of:

applying the filter to a variable temperature cycle to stress relieve the bonding.

4. The method of claim 1 wherein the repeating steps comprises the steps of:

reapplying as an input to the filter the light signal with a wavelength set to the cut-on wavelength;

rotating the filter relative to the collimator assembly to adjust the filter to the determined cut-on wavelength;

measuring spectral performance of the filter at the cut-on wavelength; and comparing the measured spectral performance with the cut-on rating value to determine if the difference is within an acceptable range.

5. The method of claim 1 wherein the repeating steps comprises the steps of:

reapplying as an input to the filter the light signal with a wavelength set to the cut-off wavelength;

rotating the filter relative to the collimator assembly to adjust the filter to the determined cut-off wavelength;

measuring spectral performance of the filter at the cut-off wavelength; and comparing the measured spectral performance with the cut-off rating value to determine if the difference is within an acceptable range.

6. The method of claim 1 wherein the step of aligning the filter to a collimator assembly comprises:

attaching the filter to a filter holder and rotatably mounting the filter holder on the collimator assembly.

7. The method of claim 1 wherein the step of determining the filter characteristics comprises the steps of:

aligning the filter between a pair of collimators;

applying a light signal to the filter for a select wavelength spectrum;

measuring spectral performance of the filter for the select wavelength spectrum; and determining the cut-on wavelength and the cut-off wavelength at a selected gain level from the measured spectral performance.

8. The method of claim 1 wherein the spectral performance measurement is measuring signal power.

9. The method of claim 8 wherein the acceptable range is ±0.5 dB.

10. A method for tuning a dielectric filter comprising the steps of:

determining filter characteristics for a filter including a cut-on wavelength and a cut-off wavelength at a selected gain level;

aligning the filter to a collimator assembly;

applying as an input to the filter a light signal having a wavelength approximately equal to the determined cut-on wavelength;

rotating the collimator assembly relative to the filter to adjust the filter to the determined cut-on wavelength;

measuring signal output from the filter at the cut-on wavelength;

comparing the measured signal output with a cut-on rating value;

applying as an input to the filter a light signal having a wavelength approximately equal to the determined cut-off wavelength;

rotating the filter relative to the collimator assembly to adjust the filter to the determined cut-off wavelength;

measuring signal output from the filter at the cut-off wavelength;

comparing the measured signal output with a cut-off rating value;

comparing the difference in measured signal power with the rating values for each of the cut-on wavelength and cut-off wavelength to determine if the difference is within an acceptable range; and fixing the filter to the collimator assembly if the difference is within an acceptable range.

11. The method of claim 10 further comprising the step of:

repeating the steps of applying a light signal at the cut-on and cut-off wavelengths and rotating the collimator assembly if the difference is not within an acceptable range.

12. The method of claim 11 further comprising the steps of:

reapplying as an input to the filter the light signal with a wavelength set to the cut-on wavelength;

rotating the collimator assembly relative to the filter to adjust the filter to the determined cut-on wavelength;

measuring signal output of the filter at the cut-on wavelength; and comparing the measured signal output with the cut-on rating value to determine if the difference is within an acceptable range.

13. The method of claim 11 further comprising the steps of:

reapplying as an input to the filter the light signal with a wavelength set to the cut-off wavelength;

rotating the collimator assembly relative to the filter to adjust the filter to the determined cut-off wavelength;

measuring signal output of the filter at the cut-off wavelength; and comparing the measured signal output with the cut-off rating value to determine if the difference is within an acceptable range.

14. The method of claim 10 wherein the step of aligning the filter to a collimator assembly comprises:

attaching the filter to a filter holder and rotatably mounting on the collimator assembly.

15. The method of claim 10 wherein the step of determining the filter characteristics comprises the steps of:

aligning the filter between a pair of collimators;

applying a light signal to the filter for a select wavelength spectrum;

measuring signal output of the filter for the select wavelength spectrum; and determining the cut-on wavelength and the cut-off wavelength at a selected gain level from the measured signal output.

16. The method of claim 10 wherein the fixing step comprises:

bonding the filter holder to the collimator assembly when the determined difference is within an acceptable range.

17. The method of claim 16 further comprising the step of:

applying the filter to a variable temperature cycle to stress relieve the bonding.

18. The method of claim 10 wherein the signal output is power.

19. The method of claim 18 wherein the acceptable range is ±0.5 dB.

20. A dielectric filter having a difference in power ratings between cut-on and cut-off wavelengths and predetermined rating values are within ±0.5 dB made by the steps of:

determining filter characteristics of a dielectric filter including a cut-on wavelength and a cut-off wavelength at a selected gain level;

aligning the filter to a collimator assembly;

applying a light signal having a wavelength approximately equal to the determined cut-on wavelength to an input of the filter;

rotating the filter relative to the collimator assembly to adjust the filter to the determined cut-on wavelength;

measuring the spectral performance of the filter at the cut-on wavelength;

comparing the measured spectral performance with a predetermined cut-on rating value;

applying a light signal having a wavelength set to the determined cut-off wavelength to an input of the filter;

rotating the filter relative to the collimator assembly to adjust the filter to the determined cut-off wavelength;

measuring the spectral performance of the filter at the cut-off wavelength;

comparing the measured spectral performance with a predetermined cut-off rating value;

comparing the difference in measured spectral performance with the rating values for each of the cut-on wavelength and cut-off wavelength to determine if the difference is within an acceptable range; and repeating the steps of applying a light signal at the cut-on and cut-off wavelengths and rotating the filter with respect to the collimator assembly if the difference is not within an acceptable range until the differences are within the acceptable range.

21. The dielectric filter of claim 20 wherein the filter is a gain flattening filter.

22. The dielectric filter of claim 20 wherein the filter is a narrow band filter.

23. The filter of claim 22 wherein the narrow band filter is a WDM filter.

24. The method of claim 20 further comprising the step of:

bonding the filter in place to the collimator assembly if the determined difference is within an acceptable range.

25. The method of claim 24 further comprising the step of:

applying the filter to a variable temperature cycle to stress relieve the bonding.

* * * * *